(12) United States Patent    (10) Patent No.: US 12,613,391 B2
Ebrahimi    (45) Date of Patent: Apr. 28, 2026

(54) BRACKET ASSEMBLY FOR FIBER OPTIC CLOSURES AND ORGANIZER ASSEMBLIES

(71) Applicant: AFL Telecommunications LLC, Duncan, SC (US)

(72) Inventor: Vahid M. Ebrahimi, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 327 days.

(21) Appl. No.: 18/391,135

(22) Filed: Dec. 20, 2023

(65) Prior Publication Data

US 2024/0393558 A1     Nov. 28, 2024

Related U.S. Application Data

(60) Provisional application No. 63/503,792, filed on May 23, 2023.

(51) Int. Cl.
G02B 6/44     (2006.01)
(52) U.S. Cl.
CPC ................................. G02B 6/4454 (2013.01)
(58) Field of Classification Search
None
See application file for complete search history.

(56)    References Cited

U.S. PATENT DOCUMENTS

| | | | |
|---|---|---|---|
| 5,323,478 A | * | 6/1994 | Milanowski ....... G02B 6/44524 |
| | | | 385/135 |
| 5,515,472 A | | 5/1996 | Mullaney et al. |

| | | | |
|---|---|---|---|
| 5,613,029 A | | 3/1997 | Burek et al. |
| 6,188,826 B1 | | 2/2001 | Daoud |
| 6,275,641 B1 | * | 8/2001 | Daoud ................. G02B 6/4455 |
| | | | 385/134 |
| 6,418,266 B1 | | 7/2002 | Vitantonio |
| 6,856,747 B2 | | 2/2005 | Cloud et al. |
| 8,311,380 B2 | | 11/2012 | Anderson et al. |
| 8,934,750 B2 | | 1/2015 | Benedetto et al. |
| 9,140,870 B2 | | 9/2015 | Marmon et al. |

(Continued)

FOREIGN PATENT DOCUMENTS

| | | |
|---|---|---|
| EP | 2605052 A3 | 9/2013 |
| EP | 3438717 B1 | 9/2021 |

(Continued)

*Primary Examiner* — Jerry Rahll

(74) *Attorney, Agent, or Firm* — Dority & Manning, P.A.

(57)    ABSTRACT

A detachable support bracket for a fiber optic closure is provided. The bracket includes a first member extending along a lateral axis and a positioning body extending along a longitudinal axis from the first member. The positioning body includes a second member extending along the longitudinal axis. A third member and a fourth member each extend along the transverse axis from the positioning body opposite one another. A fifth member extends from the first member along the longitudinal axis opposite of the second member. The bracket is selectively connectable at a hinge of the fiber optic closure. The bracket includes a tooth at the second member of the bracket is extendable onto a hinge member at an organizing system extended into the hinge. The fourth member is configured to extend alongside a hinge array body of the fiber optic closure to arrest the organizing system in a vertical position.

20 Claims, 12 Drawing Sheets

(56)　　　　　　References Cited

U.S. PATENT DOCUMENTS

| | | | |
|---|---|---|---|
| 9,575,274 B2 | 2/2017 | Allen et al. | |
| 11,009,670 B2 | 5/2021 | Kowalczyk et al. | |
| 11,513,305 B2 | 11/2022 | Cornelissen et al. | |
| 11,516,327 B2 | 11/2022 | Allen | |
| 11,630,277 B2 | 4/2023 | Claessens et al. | |
| 2005/0249475 A1* | 11/2005 | Womack | G02B 6/4455 |
| | | | 385/135 |
| 2009/0110360 A1* | 4/2009 | Anderson | G02B 6/4455 |
| | | | 385/135 |
| 2013/0105420 A1* | 5/2013 | Ray | G02B 6/4454 |
| | | | 29/559 |
| 2020/0150370 A1 | 5/2020 | Van Baelen et al. | |
| 2021/0239930 A1 | 8/2021 | Thomas et al. | |
| 2021/0373269 A1 | 12/2021 | Gross et al. | |
| 2021/0382258 A1 | 12/2021 | Claessens et al. | |
| 2022/0397735 A1 | 12/2022 | Courchaine et al. | |
| 2023/0014214 A1 | 1/2023 | Wittmeier et al. | |
| 2023/0085572 A1 | 3/2023 | Bryon et al. | |

FOREIGN PATENT DOCUMENTS

| | | | | |
|---|---|---|---|---|
| EP | 4080260 A1 | 10/2022 | | |
| FR | 2646928 A1 * | 11/1990 | | G02B 6/4452 |
| WO | WO2022/035862 A1 | 2/2022 | | |
| WO | WO2022/036219 A1 | 2/2022 | | |
| WO | WO2022/072680 A1 | 4/2022 | | |
| WO | WO2022/164632 A1 | 8/2022 | | |
| WO | WO2022/192644 A1 | 9/2022 | | |
| WO | WO2022/192788 A1 | 9/2022 | | |
| WO | WO2023/283340 A1 | 1/2023 | | |

* cited by examiner

BRACKET ASSEMBLY FOR FIBER OPTIC CLOSURES AND ORGANIZER ASSEMBLIES

PRIORITY STATEMENT

The present application claims the benefit of priority to U.S. provisional application No. 63/503,792, filed May 23, 2023, the disclosure of which is incorporated herein in its entirety.

FIELD

The present disclosure relates generally to closures, such as for fiber optic cable connections, and more specifically to improved organizer assemblies for butt closures.

BACKGROUND

Certain closures, also referred to as "butt" or "domed" closures, are utilized in outdoor environments to facilitate the connection of transmission cables such as fiber optic cables. The cables enter the closure through a sealed base, and connection of the cable elements occurs within the closure. In the case of fiber optic cables, spliced-together optical fibers are held within the closure.

Many fiber organizer assemblies utilized in known butt closures generally have edges that can cause buffer tubes to kink if they are pulled over these edges. Further, in many cases, trays of the organizer assemblies must be held in the vertical or up position while other trays are being populated with fiber and while splicing is being done. Still further, splice modules utilized in such trays provide limited flexibility with respect to the types of splices and/or other components that can be held therein.

Structures for supporting and arresting organizer assemblies at a fiber optic closure would be advantageous and beneficial for performing tasks at multiple fiber optic trays, such as splicing, routing, or other tasks. Still further, a structure that is utilizable at various types of fiber optic closures would be beneficial for a technician, such as to allow for arresting the tray in an upward position without requiring features integrated or formed at the fiber optic closure for securing the tray.

Accordingly, support structures for organizer assemblies would be advantageous. Specifically, structures and organizer assemblies which address one of more of the above-stated deficiencies would be advantageous.

BRIEF DESCRIPTION

Aspects and advantages of the invention will be set forth in part in the following description, or may be obvious from the description, or may be learned through practice of the invention.

An aspect of the present disclosure is directed to a fiber optic closure. The closure includes a base insertable at least partially into an interior of the closure. A basket extends along a longitudinal axis between a first end and a second end. The first end forms an open end such that one or more cables extends into the interior of the closure along the longitudinal axis, and the second end forms a closed end. A fiber optic organizing system extends along a longitudinal axis between a first end and a second end and extending along a lateral axis between a pair of sidewalls. A connector shaft extends from the first end along the longitudinal axis, the connector shaft connecting the organizing system and the base together. A detachable bracket includes a first member extending along the lateral axis and a positioning body extending along the longitudinal axis from the first member. The positioning body includes a second member extending along the longitudinal axis. A third member and a fourth member each extend along the transverse axis from the positioning body opposite one another. A fifth member extends from the first member along the longitudinal axis opposite of the second member. A hinge array body includes a plurality of hinges positioned along a transverse axis from the basket. The bracket is selectively connectable at the plurality of hinges and includes a tooth at the second member of the bracket is extendable onto a hinge member at the organizing system extended into the hinge. The fourth member is configured to extend alongside a vertically extending portion of the hinge array body to arrest the organizing system in a vertical position. The organizing system is rotatably and removably connectable to the bracket assembly between the hinge assemblies.

Another aspect of the present disclosure is directed to a detachable support bracket for a fiber optic closure. The bracket includes a first member extending along a lateral axis and a positioning body extending along a longitudinal axis from the first member. The positioning body includes a second member extending along the longitudinal axis. A third member and a fourth member each extend along the transverse axis from the positioning body opposite one another. A fifth member extends from the first member along the longitudinal axis opposite of the second member. The bracket is selectively connectable at a hinge of the fiber optic closure. The bracket includes a tooth at the second member of the bracket is extendable onto a hinge member at an organizing system of the fiber optic closure extended into the hinge. The fourth member is configured to extend alongside a vertically extending portion of a hinge array body of the fiber optic closure to arrest the organizing system in a vertical position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
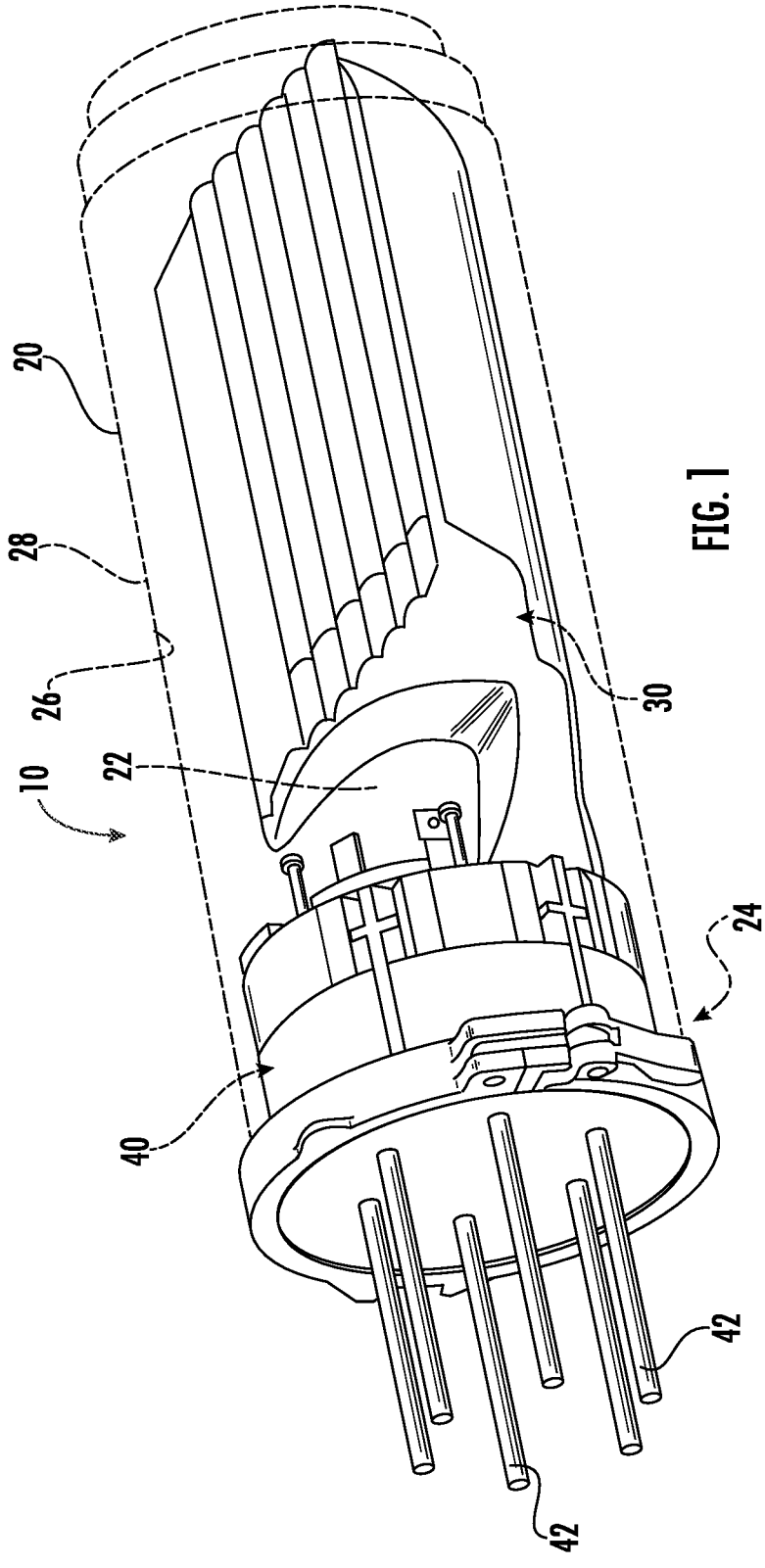
FIG. 1 is a perspective view of a fiber optic closure in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, embodiments of butt closures 10 and organizer assemblies in accordance with the present disclosure are provided. Closures 10 in accordance with the present disclosure, and in particular the organizer assemblies and deep tray organizer assemblies, thereof, may advantageously provide improved routing features which reduce kinking and attenuation risks. Additionally or alternatively, closures 10, organizer baskets 110, 150, and trays 200, 300 thereof in accordance with the present disclosure may advantageously provide improved features for securing and positioning organizer trays thereof in a variety of positions, thus advantageously allowing efficient and effective fiber-populating, splicing, etc. Additionally, or alternatively, closures 10 and organizer baskets thereof in accordance with the present disclosure, and in particular the splice modules and adapter modules which may be utilized with such closures 10 and/or organizer baskets and trays, may advantageously provide improved flexibility with respect to the types of splices and/or other components that can be held therein.

Referring now to FIG. 1, a closure 10 in accordance with the present disclosure includes a cover 20. Cover 20 is generally a domed cover which defines an interior 22 and an opening 24 which provides access to the interior 22. Cover 20 may include an inner surface 26 which defines the interior 22 and an opposing outer surface 28 which is exposed to the external environment.

An organizer assembly 30 may be insertable into (and thus disposed within) the interior 22, such as along a longitudinal axis of the closure 10. Organizer assembly 30 may include one or more organizer trays 200 and/or other suitable components for facilitating transmission component connections. For example, in the case of use with fiber optic cables, splices between optical fibers thereof may be housed in the various splice trays.

A base 40 may be insertable at least partially into (and thus disposed at least partially within) the interior 22. In some embodiments, organizer assembly 30 may be connected to the base 40, such that insertion of the base 40 causes insertion of the tray assembly 30 into the interior 22. Cables 42 may be inserted through the base 40 into the interior 22, and connection between transmission elements thereof (such as optical fibers) may be made within the interior 22, such as in the organizer trays 200 of the organizer assembly 30.

FIGS. 2-12B illustrate various embodiments of organizer assemblies 30 and brackets 140 in accordance with embodiments of the present disclosure. A mutually orthogonal coordinate system may be defined for organizer assemblies 30 in accordance with the present disclosure, and may include a mutually orthogonal longitudinal axis 102, lateral axis 104, and transverse axis 106.

Organizer assemblies 30 in accordance with the present disclosure may include a basket 110. The basket 110 generally forms at least a portion of the base exterior of the organizer assembly 30, and includes an exterior surface 112 and an interior surface 114. The basket 110 may extend along the longitudinal axis 102 between a first end 116 and a second end 118. The first end 116 may be an open end, as shown, such that cables 42 or transmission elements thereof being directed along and parallel to the longitudinal axis 102 can enter or exit an interior 120 of the basket 110 through the first end 116. The second end 118 may be a closed end, as shown, such that cables 42 (FIG. 1) or transmission elements thereof being directed along and substantially parallel to the longitudinal axis 102 cannot enter an interior 120 of the basket 110 through the second end 118, and instead encounter a surface of the basket 110.

The basket 110 may further extend along the lateral axis 104 between a first side 122 and a second side 124, both of which may be closed (as discussed above with respect to second end 118). In exemplary embodiments, a length between the first end 116 and second end 118 is greater than a length between the first side 122 and the second side 124. Further, in exemplary embodiments, transitions between the closed second end 118 portion and a base portion 126, the closed first side portion 122 and the base portion 126, the closed second side portion 124 and the base portion 126, the closed second end 118 portion and closed first side portion 122, and/or the closed second end 118 portion and closed second side portion 124 are curved.

Basket 110 may generally be utilized to house excess cables 42 and/or transmission elements thereof as the cables 42 and/or transmission elements thereof are routed through the closure 10 and organizer assembly 30 thereof.

Basket 110 may further include an upper peripheral lip 128, which may extend between the first end 116 and second end 118, such as on the sides 122, 124, and may further extend between the sides 122, 124, such as along the closed second end 118. For example, the lip 128 may extend along an upper edge (along the traverse axis 106) of the basket 110, such as along the sides 122, 124 and second end 118.

In some embodiments, basket 110 may further include a plurality of retainer tabs 132, each of which extends from the basket 110 into the interior 120. The tabs 132 may be connected to the basket 110 at the upper edge of the basket 110, such as adjacent the lip 128. Further, in exemplary embodiments, the tabs 132 are removable. In some embodiments, the tabs 132 may be connected to the basket 110 at interior surface 114 within interior 120. Tabs 132 may generally assist in routing and retaining cables 42 and transmission elements in the interior 120 during assembly, splicing, etc., thereof.

A connector shaft 138 may extend from the first end 116 along the longitudinal axis 102, such that at least a portion of the connector shaft 138 is exterior to the basket 110. The connector shaft 138 may connect to the base 40 (FIG. 1), thus connecting the organizer assembly 30 and base 40 together.

A hinge array body 142 includes a plurality of hinges 144. The body 142 may extend along the transverse axis 106 such as to position the plurality of hinges 144 spaced apart in a linear array along the transverse axis 106. In exemplary embodiments, the body 142 positions the hinges 144 stepped along the transverse axis 106. In these embodiments, the linear array of the hinges 144 is angled relative to the transverse axis 106, rather than being directed along or parallel to the transverse axis 106. At least the portion of the body 142 including the hinges 144 may also be so angled. Such angle may be between the transverse axis 106 and the longitudinal axis 102, as shown.

Figure 2:
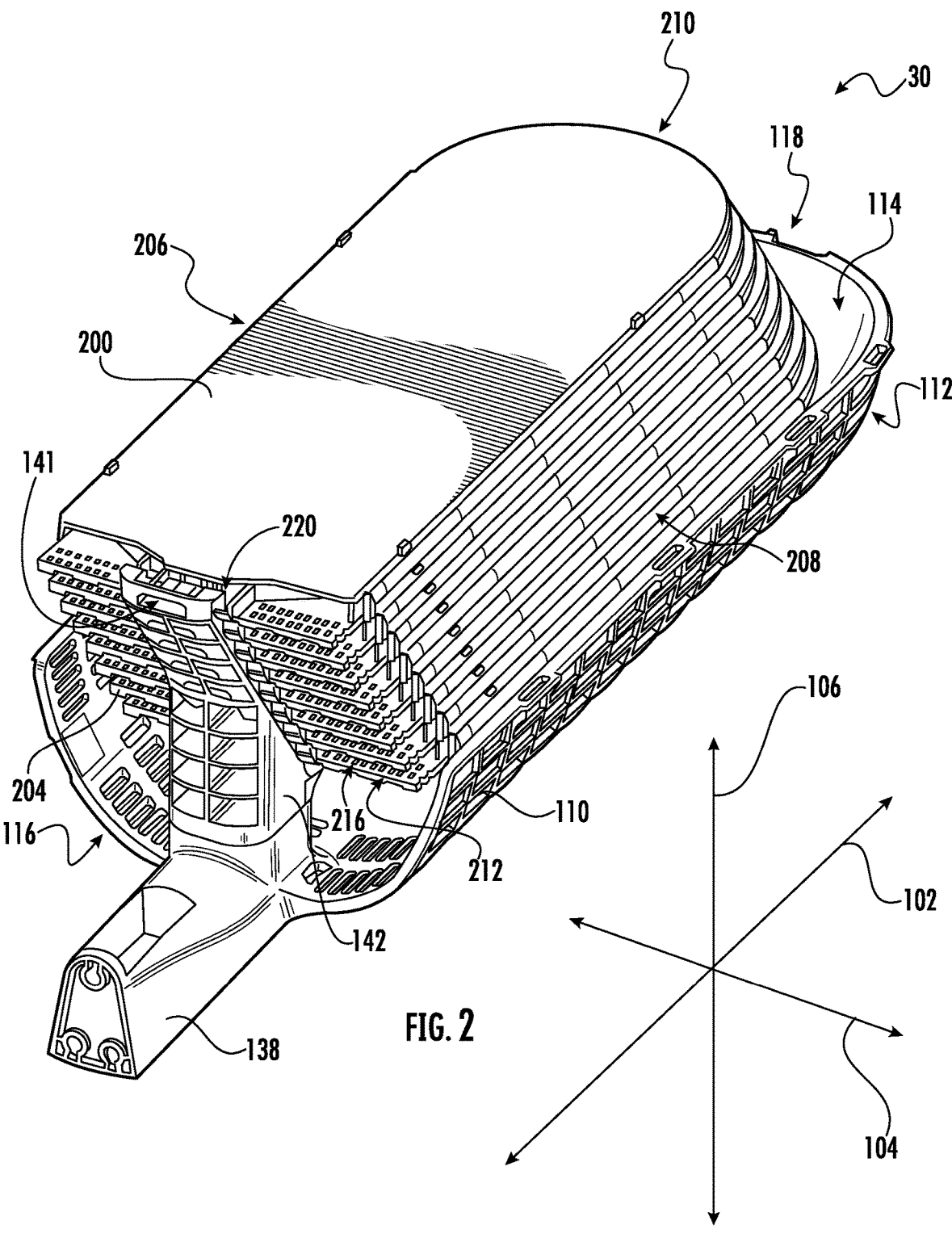
FIG. 2 is a rear perspective view of a plurality of organizer assemblies at the fiber optic closure in accordance with embodiments of the present disclosure.
Figure 3:
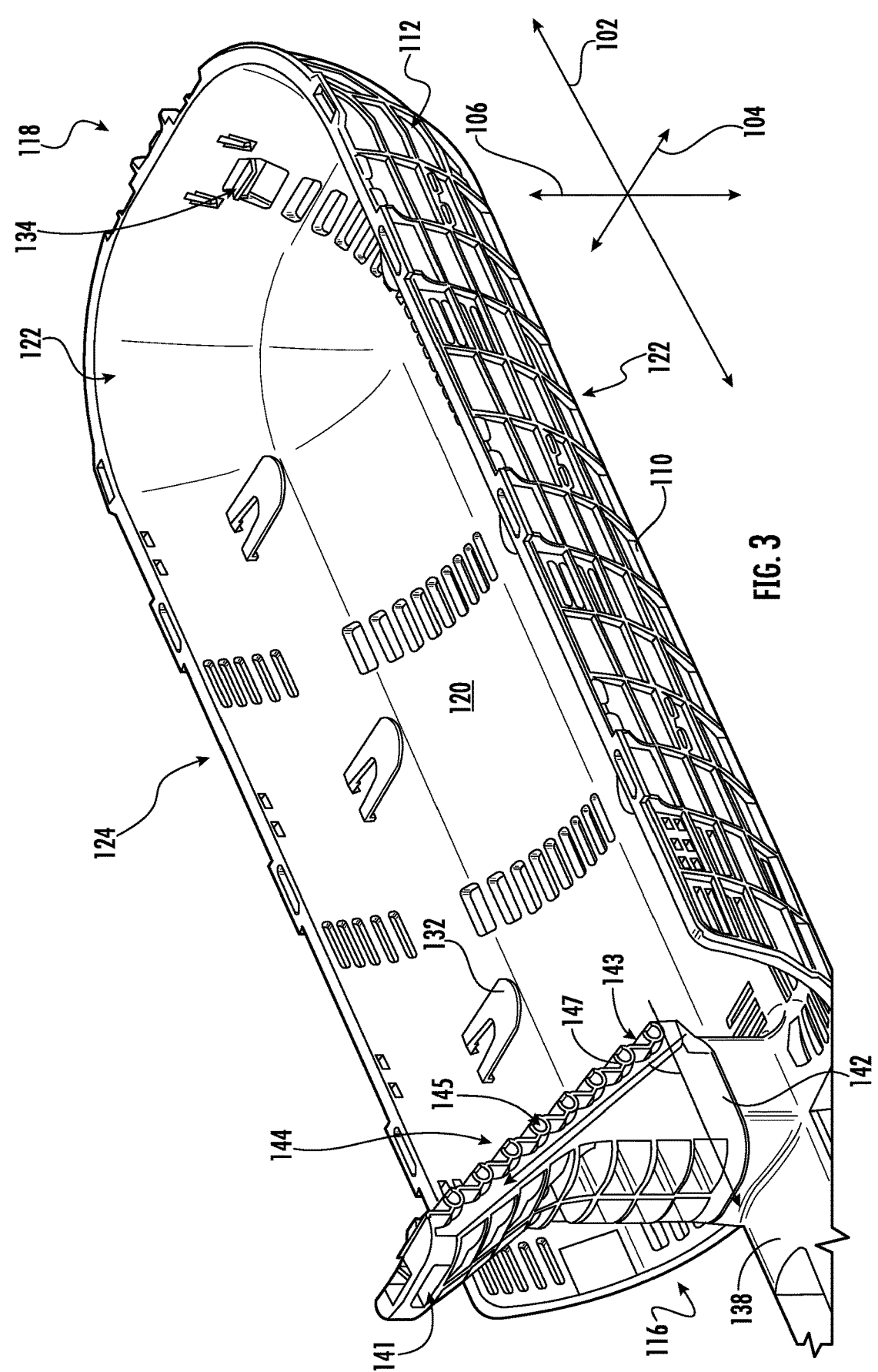
FIG. 3 is a rear perspective view of a basket for a fiber optic closure in accordance with embodiments of the present disclosure.
Figure 4:
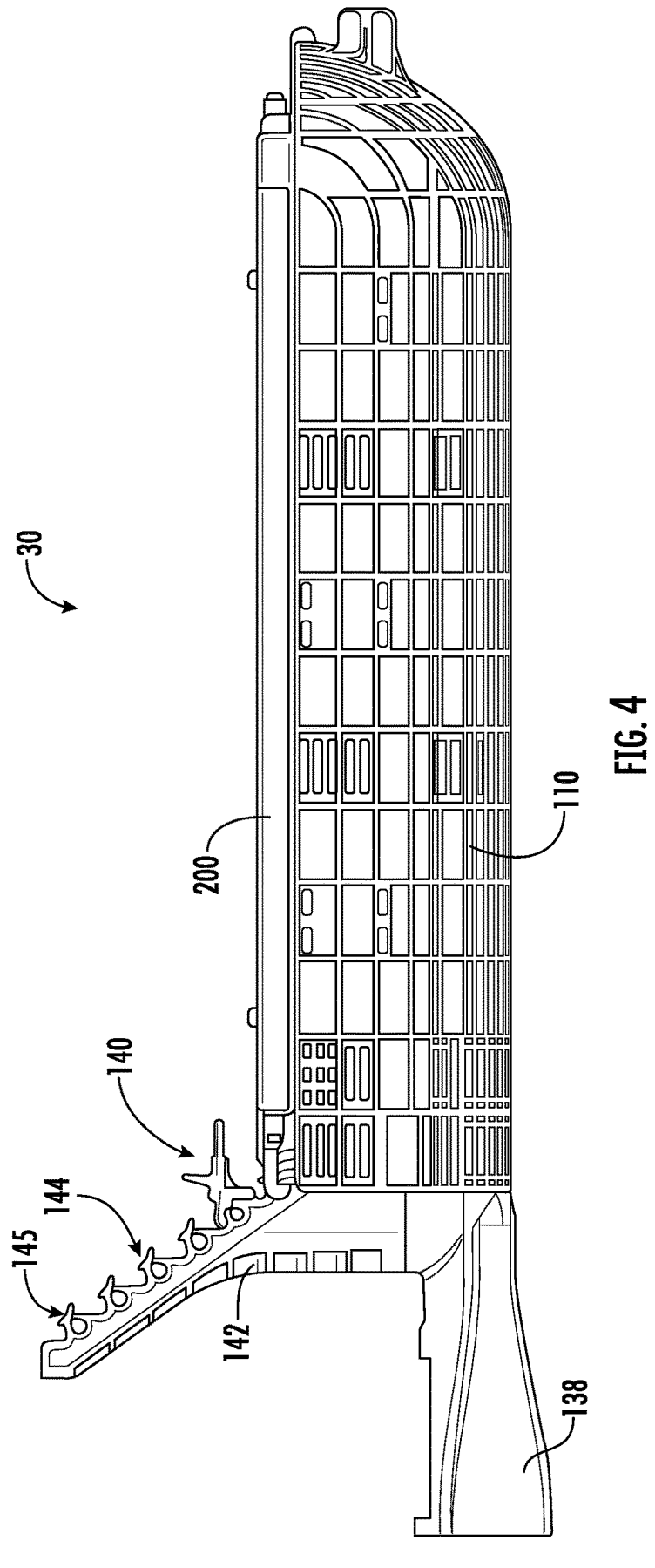
FIG. 4 is a side view of the basket of the fiber optic closure in accordance with embodiments of the present disclosure.
Figure 10:
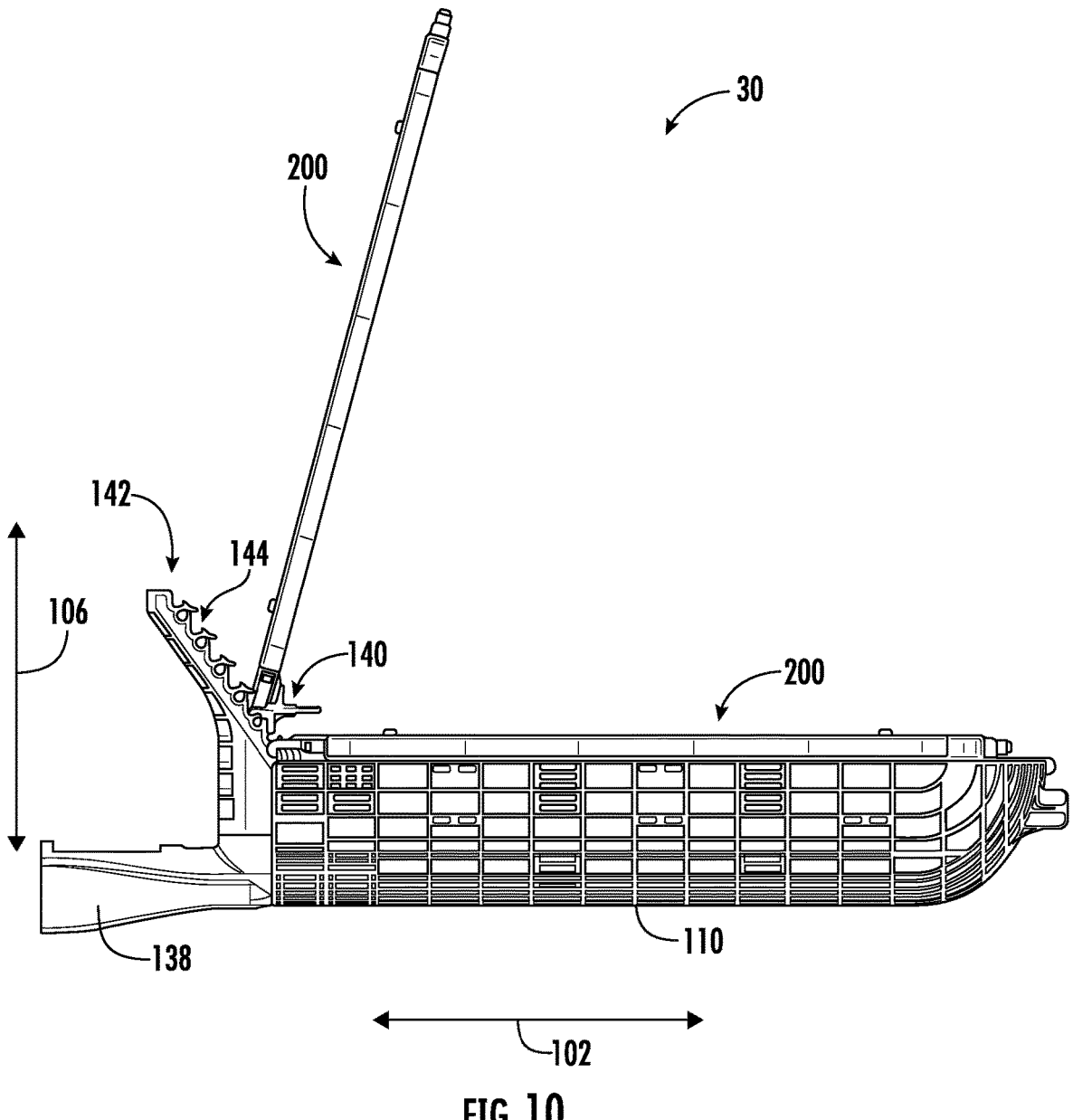
FIG. 10 is a side view of the fiber optic closure including the bracket and the organizer assembly in an arrested vertical position in accordance with embodiments of the present disclosure.
Figure 11A:
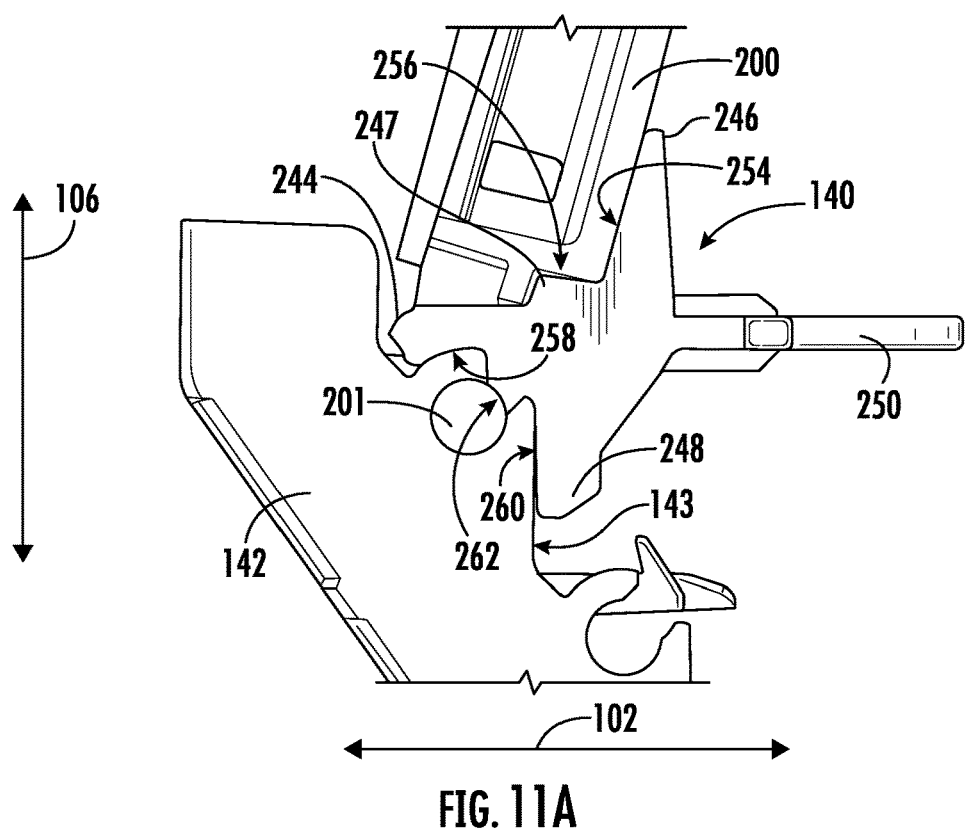
FIG. 11A is a detailed side view of an embodiment of the fiber optic closure including the bracket and the organizer assembly in an arrested vertical position in accordance with embodiments of the present disclosure.
Figure 11B:
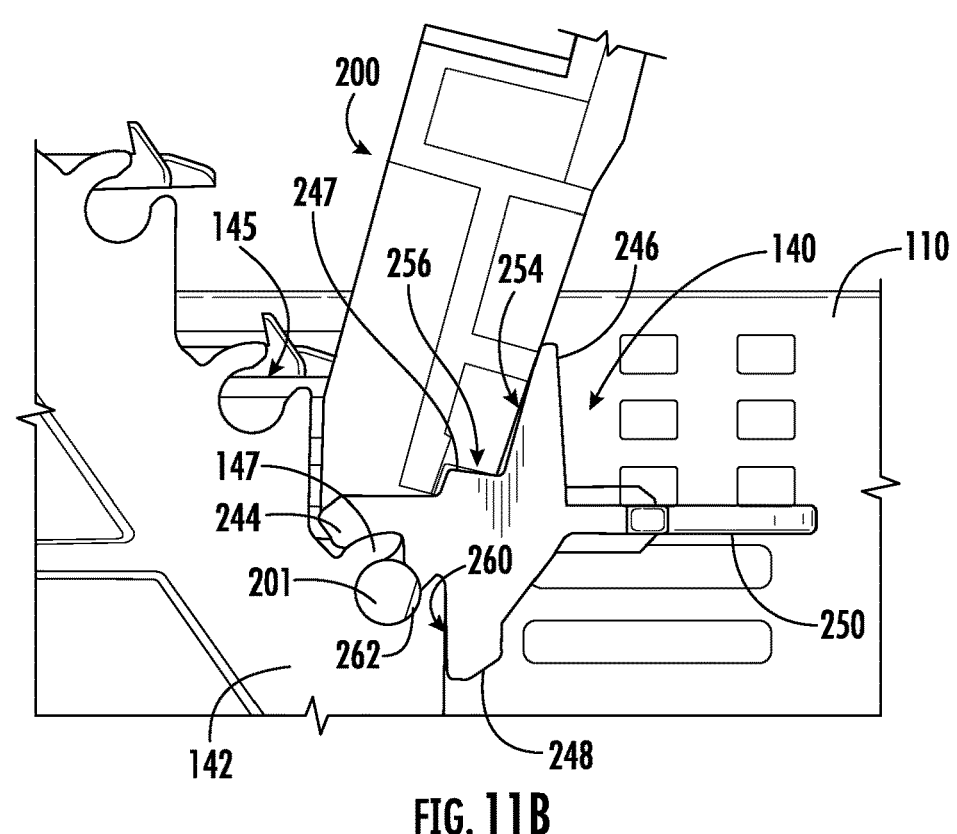
FIG. 11B is a detailed side view of an embodiment of the fiber optic closure including the bracket and the organizer assembly in an arrested vertical position in accordance with embodiments of the present disclosure.
Figure 12A:
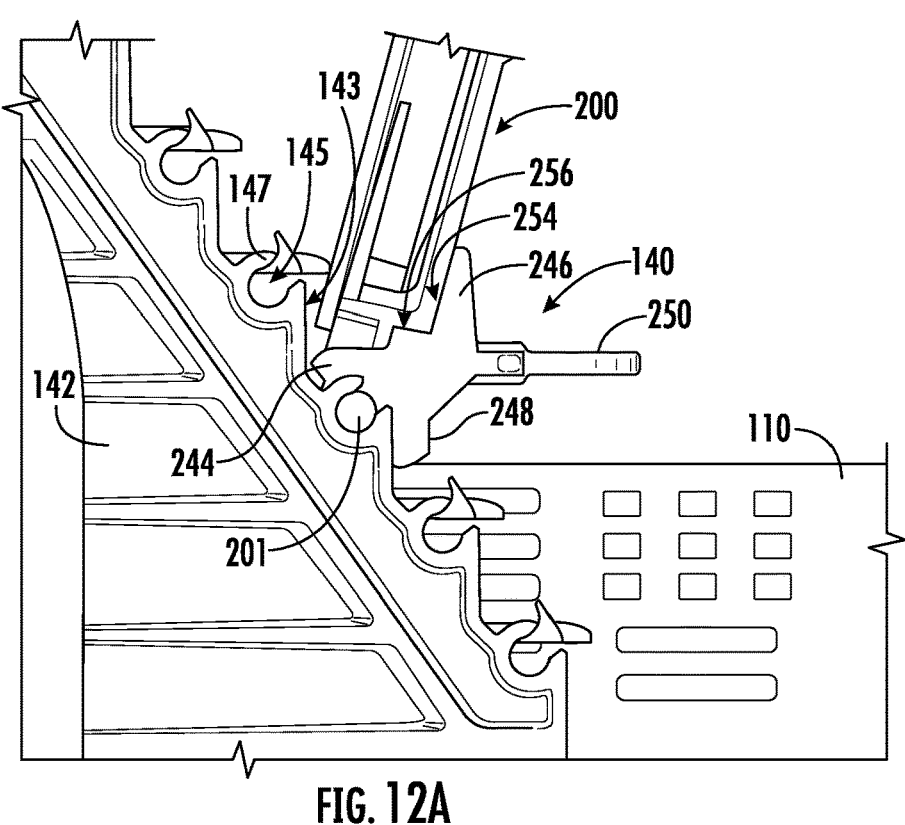
FIG. 12A is a detailed side view of an embodiment of the fiber optic closure including the bracket and the organizer assembly in an arrested vertical position in accordance with embodiments of the present disclosure.
Figure 12B:
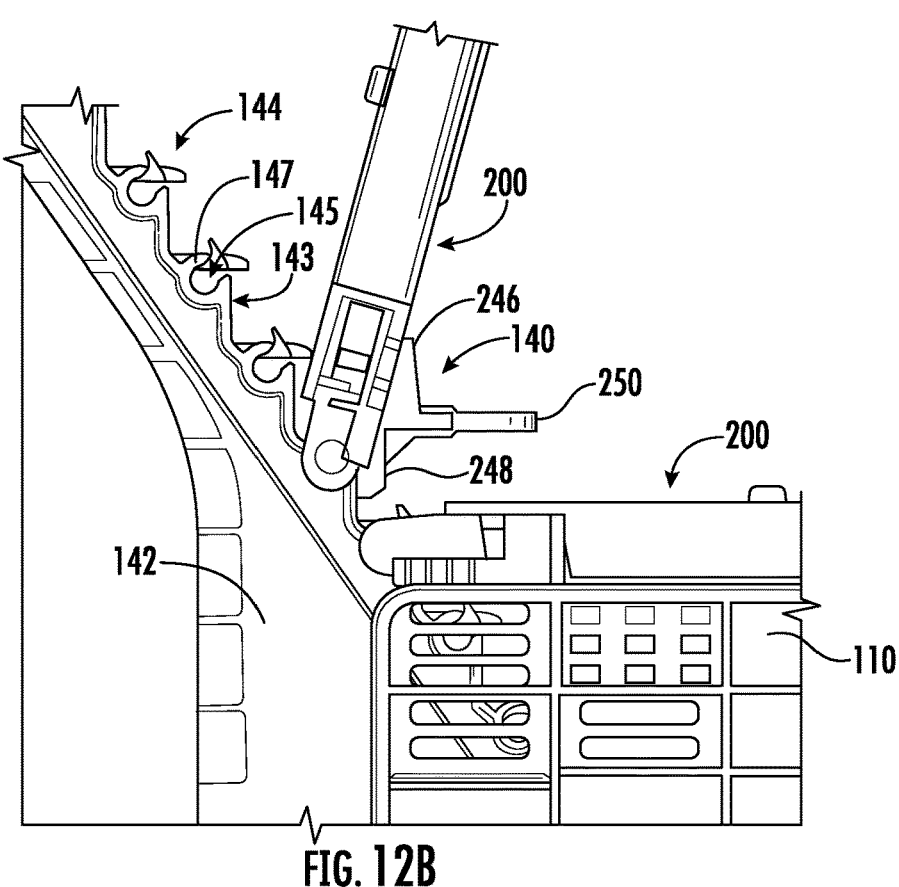
FIG. 12B is a detailed side view of an embodiment of the fiber optic closure including the bracket and the organizer assembly in an arrested vertical position in accordance with embodiments of the present disclosure.

Organizer assemblies 30 in accordance with the present disclosure may further include one or more organizer trays 200. Each organizer tray 200 is rotatably connectable and removable, and thus may be rotatably connected, to a hinge assembly 144 and bracket 140. Each organizer tray 200 may be rotatable, such as between a first position wherein the organizer tray 200 is aligned along the longitudinal axis 102 (such as shown in FIG. 2) and a second position wherein the organizer tray 200 is aligned along an angle between the transverse axis 106 and the longitudinal axis 102 (such as shown at FIGS. 10-12).

For example, each organizer tray 200 may include a tray main body 202. Tray main body 202 may, for example, include a base wall 204, a first sidewall 206, a second sidewall 208, and a front wall 210, and may further define a rear end 212. First sidewall 206 and second sidewall 208 may be spaced apart along the lateral axis 104. Front wall 210 and rear end 212 may be spaced apart (such as along the longitudinal axis 102 when in the first position). The rear end 212 may be an open end, as shown, such that cables 42 (FIG. 1) or transmission elements thereof being directed along and parallel to the longitudinal axis 102 can enter or exit an interior 214 of the organizer tray 200 through the rear end 212, when the organizer tray 200 is in the first position. The front wall 210 and sidewalls 206, 208 may define a closed end and closed sides.

In some embodiments, a plurality of apertures 216 may be defined in the base wall 204, such as at the rear end 212. Each aperture 216 may be utilized to secure a cable 42 (or transmission element thereof) directly to the base wall 204 and organizer tray 200 thereof, such as using a suitable zip-tie or other suitable fastener.

Organizer tray 200 may further include one or more connector arms 220 including connector member 201 which may extend from the main body 202. For example, each connector arm 220 may extend from the base wall 204, such as along the longitudinal axis 102 when in the seated position (e.g., depicted in FIG. 2). The connector arms 220 may be removably connected to the hinge 144 through the notch 145, thus rotatably connecting the organizer tray 200 thereto.

Each of the plurality of organizer trays 200 may be rotatable between a first position and a second position. Further, each organizer tray 200 may advantageously be releasably securable in the second position, thus facilitating efficient loading of cables 42 and transmission elements thereof, splicing, etc., into other organizer trays 200 and the assembly 30 generally. The hinge 144 which rotatably connects the organizer tray 200 to the hinge array body 142 may releasably secure the organizer tray 200 in the second position via a detachable bracket 140.

Figure 5:
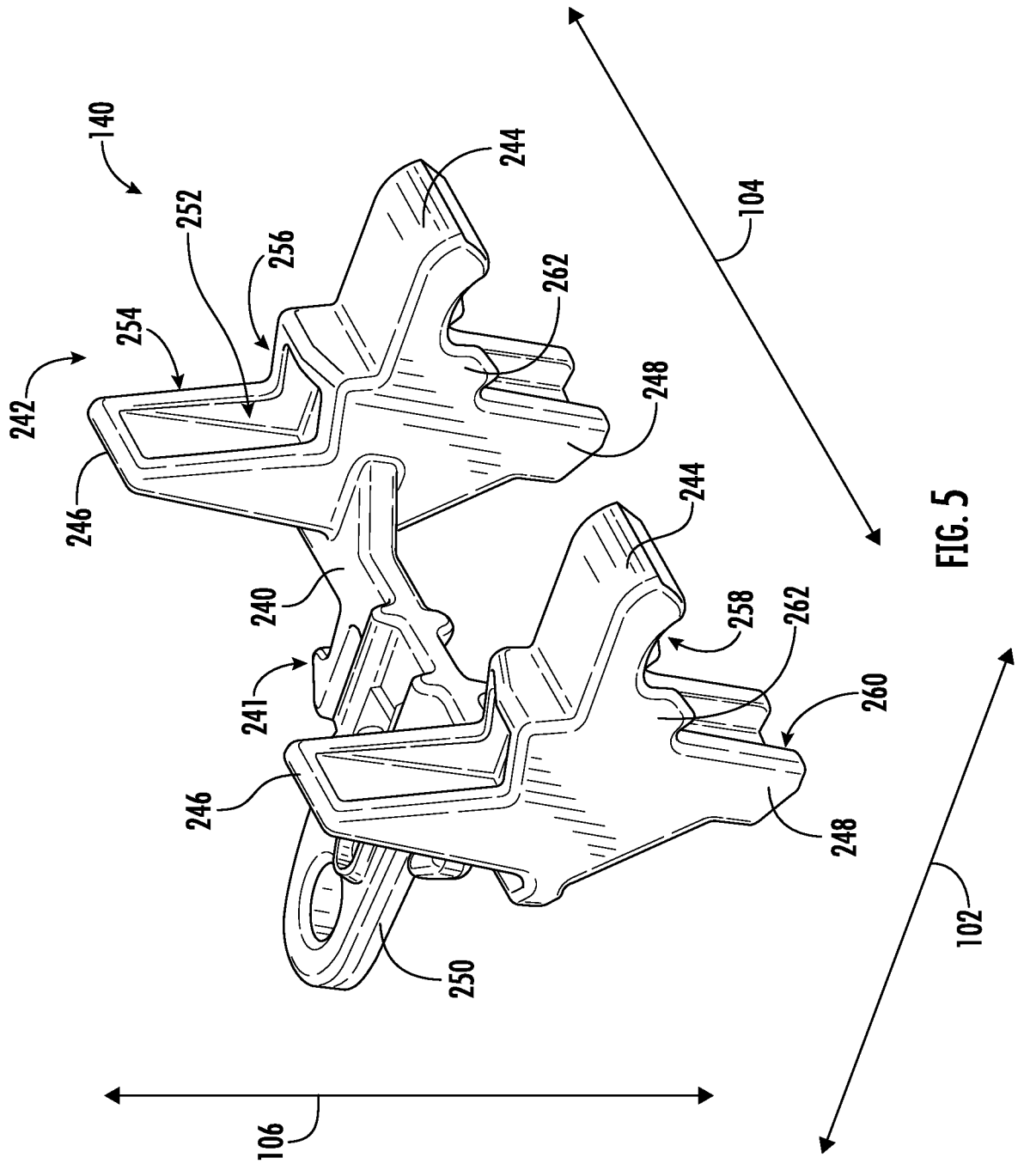
FIG. 5 is a perspective view of an embodiment of a detachable bracket for a fiber optic closure in accordance with embodiments of the present disclosure.
Figure 6:
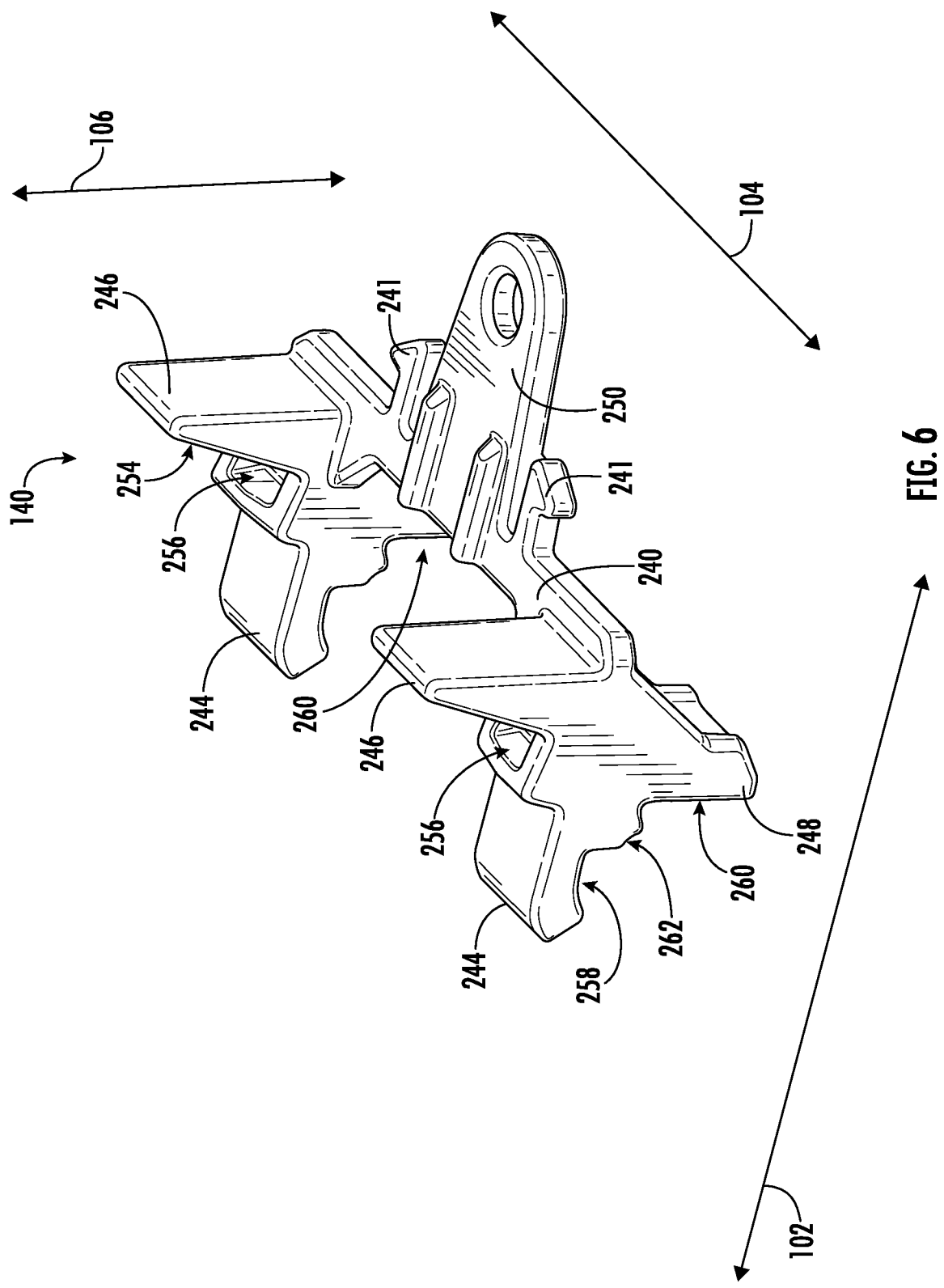
FIG. 6 is a perspective view of an embodiment of the detachable bracket for a fiber optic closure in accordance with embodiments of the present disclosure.
Figure 7:
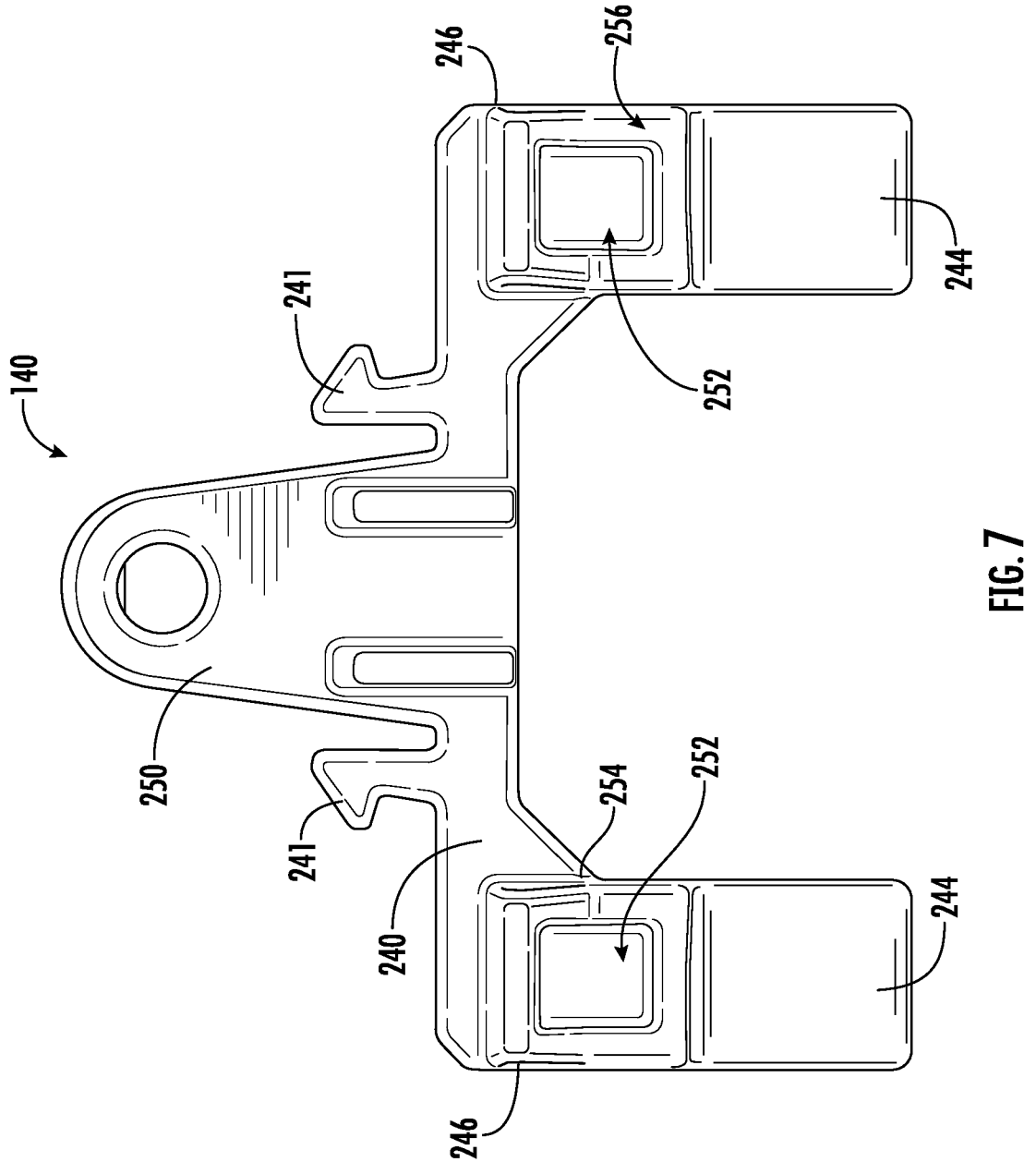
FIG. 7 is a plan view of an embodiment of the detachable bracket for a fiber optic closure in accordance with embodiments of the present disclosure.

Referring to FIGS. 5-7, perspective views of an embodiment of the detachable bracket 140 are provided. The bracket 140 is selectively positioned at one or more hinges 144 (FIGS. 1-4) at the hinge array body 142. The bracket 140 includes a first member 240 extending substantially along the lateral axis 104 and a positioning body 242 extending along the longitudinal axis 102 from the first member 240. The positioning body 242 includes a second member 244 extending substantially along the longitudinal axis 102. The positioning body 242 includes a third member 246 extending substantially along the transverse axis 106. A fourth member 248 extends substantially along the transverse axis 106 opposite of the third member 246. A fifth member 250 extends from the first member 240 substantially along the longitudinal axis 102 opposite of the second member 244.

A step 247 may be formed between the second member 244 and the third member 246. For instance, the step 247 may extend co-directional to the second member 244, or at an angle between the longitudinal axis 102 and the transverse axis 106, such as further described in regard to a longitudinal face 256 at the step 247 described herein.

The third member 246 may form a cavity 252 into which a portion of the tray 200 is receivable. The third member 246 includes a transverse face 254. In some embodiments, the cavity 252 is formed into the third member 246 at the faces 254, 256. In still some embodiments, the faces 254, 256 are angled. For instance, an angle between the faces 254, 256 may be substantially 90 degrees. The angular extension of the faces 254, 256 may be offset or tilted, such that the face 256 is angled up from the longitudinal axis 102 greater than zero degrees (e.g., non-parallel to the longitudinal axis 102) and up to approximately 80 degrees from the longitudinal axis 102 (e.g., between the longitudinal axis 102 and the transverse axis 106).

The second member 244 includes a lower face 258 configured to abut the hinge 144 at the hinge array body 142. For instance, the lower face 258 may extend substantially along the longitudinal axis 102 and abut a longitudinally extended face at the body 142. The fourth member 248 further includes an abutting face 260 configured to abut the hinge 144 at the hinge array body 142. For instance, the abutting face 260 may extend along the transverse axis 106 and abut a longitudinally extended face at the body 142.

A tooth 262 may extend from between the lower face 258 and the abutting face 260 along an angle between the longitudinal axis 102 and the transverse axis 106. The tooth 262 is configured to extend into a notch 145 formed at the hinge 144. For instance, the notch 145 provides an opening at the hinge 144 through which a member 201 at the organizer tray 200 may extend into to rotatably attach the tray 200 to the hinge 144, such as depicted in FIGS. 10-12. The notch 145 may be formed as an arcuate opening through a substantially circular member 147 forming a recess at which the member 201 at the tray 200 is received. Referring to FIGS. 10-12, the tooth 262 is configured to extend at least partially into the notch 145, such as to allow the member 201 and the tooth 262 to each extend into the notch 145.

As depicted in FIGS. 11-12, fourth member 248 is configured to extend alongside a vertically extending portion 143 of the hinge array body 142, such as extending along transverse axis 106. For instance, face 260 may abut to the vertically extending portion 143. Second member 244 is configured to extend alongside a substantially horizontally extending portion of circular member 147, such as extending along longitudinal axis 102. For instance, face 258 may abut to the horizontally extending portion of circular member 147.

Figure 8A:
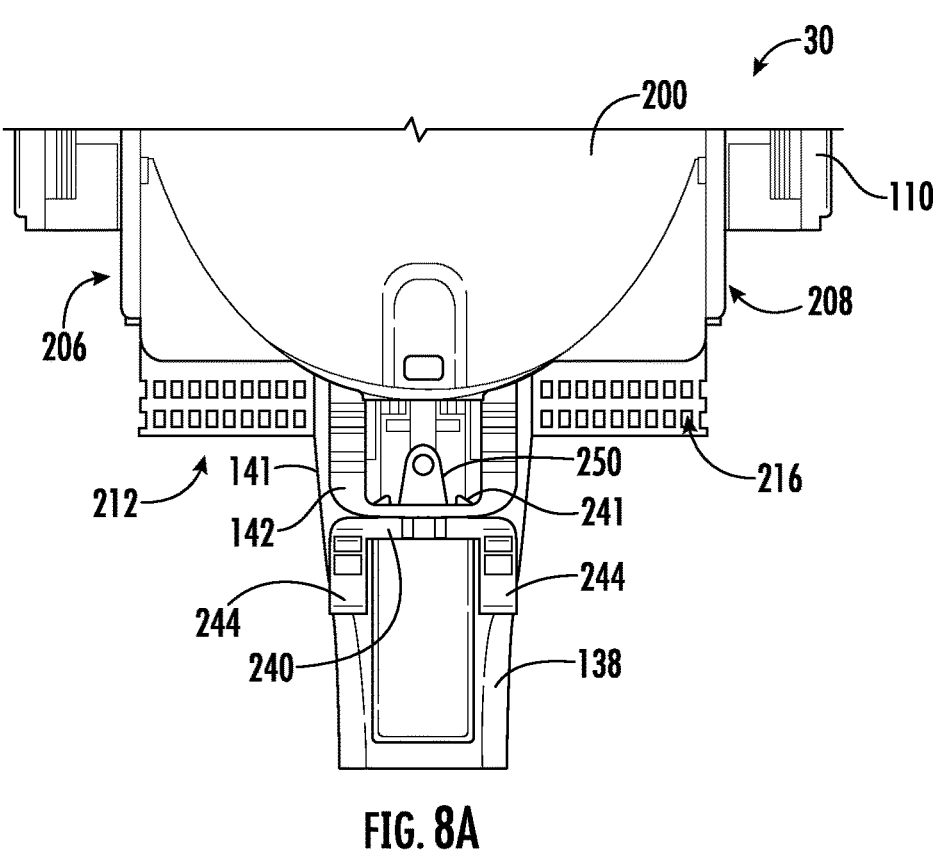
FIG. 8A is a plan view of the detachable bracket at the fiber optic closure in accordance with embodiments of the present disclosure.
Figure 8B:
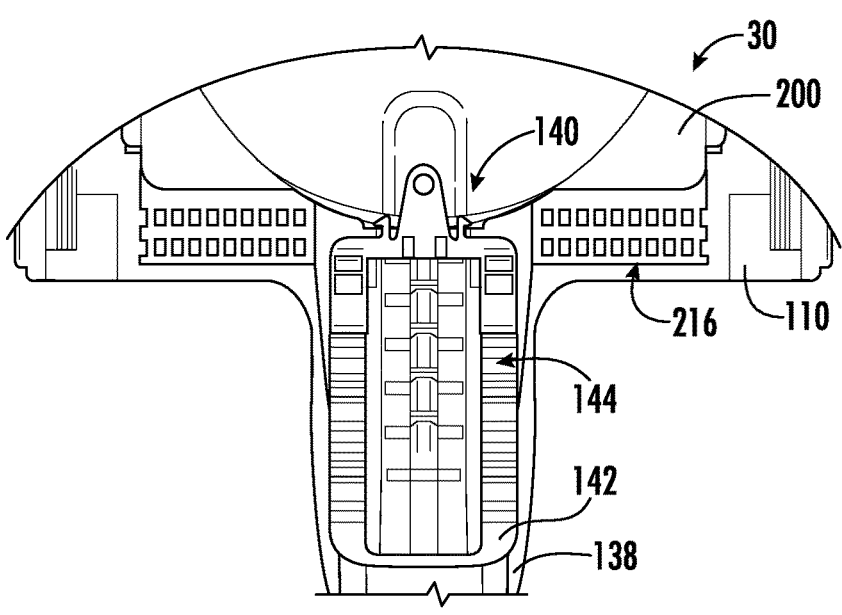
FIG. 8B is a plan view of the detachable bracket at the fiber optic closure in accordance with embodiments of the present disclosure.
Figure 9:
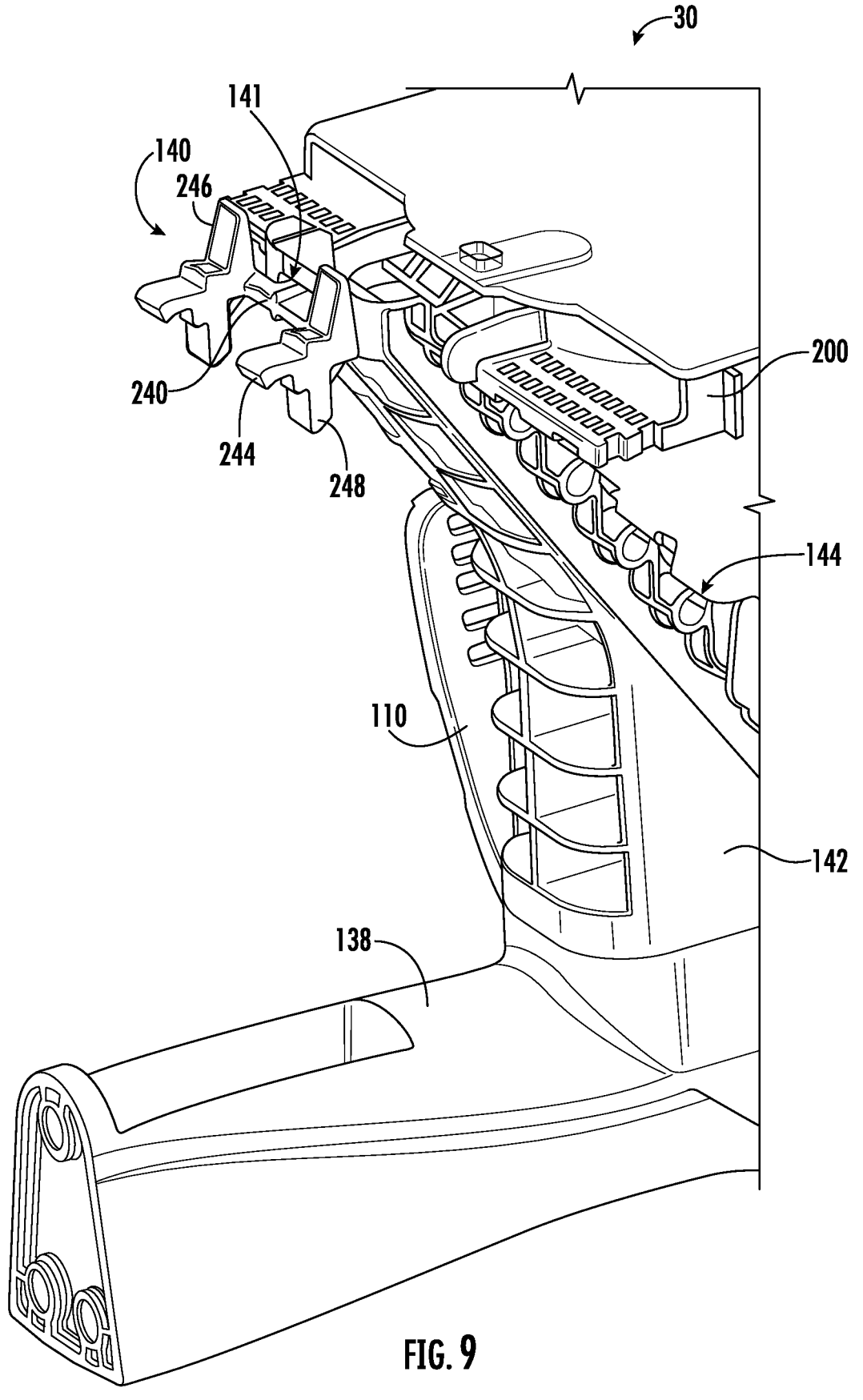
FIG. 9 is a perspective view of an embodiment of the detachable bracket at an opening at the fiber optic closure in accordance with embodiments of the present disclosure.

Referring still to FIGS. 11-12, bracket 140 is configured to arrest the tray 200 in a vertical position, such as extending along transverse axis 106, or along an angle between transverse axis 106 and longitudinal axis 102, such as corresponding to an angle between faces 254, 256 as described above. Bracket 140 is configured to receive an end of the tray 200, such as a rear end 212 (FIG. 2) of the tray 200. Referring to the top-down plan view in FIG. 8B, the bracket 140 may position atop the Referring to FIGS. 2-3, the hinge array body 142 includes an opening 141 through which the fifth member 250 is extendable. The opening 141 at the body 142 may allow for storing the bracket 140 when not in use to arrest the tray 200, such as depicted in FIG. 8A and FIG. 9. The bracket 140 may include teeth 241 extending alongside the fifth member 250. The opening 141 may include members or clips at which the teeth 241 may secure onto, such as to clip or snap into position through the opening 141. In still various embodiments, the fifth member 250 may include a hole or opening allowing the bracket 140 is be positioned at a hook or other member.

Embodiments of the detachable bracket 140 provided herein allow a user to desirably and advantageously position and arrest the tray 200 at an angular position, such as to facilitate and promote routing of cables 41 into the basket 110 and perform splicing, routing, organization, or other tasks at another tray 200. The bracket 140 is selectively positioned at the plurality of hinges 144, such as to arrest one or more trays 200 in the angled position. For instance, in a lower hinge 144 (e.g., closer to basket 110), the bracket 140 may arrest multiple of trays 200 positioned at respective hinges 144 at the hinge array body 142. The bracket 140 may be formed of any suitable material for supporting the weight of the plurality of trays 200 and components positioned therewithin, and the bending or torsion stresses induced by the weight of the plurality of trays 200. For instance, the bracket 140 may be formed from a plastic material, a natural or synthetic rubber material, a metallic material, a composite material, or a combination thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic closure, the closure comprising:
a base insertable at least partially into an interior of the closure;
a basket extending along a longitudinal axis between a first end and a second end, wherein the first end forms an open end such that one or more cables extends into the interior of the closure along the longitudinal axis, and the second end forms a closed end;
a fiber optic organizing system extending along a longitudinal axis between a first end and a second end and extending along a lateral axis between a pair of sidewalls;
a connector shaft extending from the first end along the longitudinal axis, the connector shaft connecting the organizing system and the base together;
a detachable bracket comprising a first member extending along the lateral axis and a positioning body extending along the longitudinal axis from the first member, the positioning body comprising a second member extending along the longitudinal axis, a third member and a fourth member each extend along the transverse axis from the positioning body opposite one another, a fifth member extends from the first member along the longitudinal axis opposite of the second member; and
a hinge array body comprising a plurality of hinges positioned along a transverse axis from the basket, wherein the bracket is selectively connectable at the plurality of hinges, the bracket comprising a tooth at the second member of the bracket is extendable onto a hinge member at the organizing system extended into the hinge, and wherein the fourth member is configured to extend alongside a vertically extending portion of the hinge array body to arrest the organizing system in a vertical position, wherein the organizing system is rotatably and removably connectable to the bracket assembly between the hinge assemblies.

2. The fiber optic closure of claim 1, wherein the bracket comprises a lower face and an abutting face along an angle between the longitudinal axis and the transverse axis, wherein the tooth extends from between the lower face and the abutting face.

3. The fiber optic closure of claim 2, wherein the hinge forms a notch as an arcuate opening through which the hinge member at the organizing system and the tooth of the bracket is receivable.

4. The fiber optic closure of claim 1, wherein the third member extends upward along the vertical axis to form a post at which the organizing system is arrested substantially along the vertical axis.

5. The fiber optic closure of claim 4, wherein the third member comprises a pair of faces angled to one another, and wherein the organizer system is configured to abut the pair of faces to arrest substantially along the vertical axis.

6. The fiber optic closure of claim 5, wherein the pair of faces are positioned 90 degrees to one another.

7. The fiber optic closure of claim 5, wherein the pair of faces is tilted at an angle between zero and approximately 80 degrees from the longitudinal axis.

8. The fiber optic closure of claim 1, wherein a step is formed between the second member and the third member at which the first end of the organizer system abuts the bracket in the vertical position.

9. The fiber optic closure of claim 1, the hinge array body comprising an opening through which the fifth member is extendable.

10. The fiber optic closure of claim 9, wherein the bracket comprises teeth extending alongside the fifth member, wherein teeth at the bracket are configured to engage within the opening at the hinge array body.

11. The fiber optic closure of claim 1, wherein the bracket is a unitary, monolithic component.

12. A detachable support bracket for a fiber optic closure, the bracket comprising:
   - a first member extending along a lateral axis and a positioning body extending along a longitudinal axis from the first member, the positioning body comprising a second member extending along the longitudinal axis;
   - a third member and a fourth member each extend along the transverse axis from the positioning body opposite one another;
   - a fifth member extends from the first member along the longitudinal axis opposite of the second member, wherein the bracket is selectively connectable at a hinge of the fiber optic closure;
   - a tooth at the second member of the bracket is extendable onto a hinge member at an organizing system of the fiber optic closure extended into the hinge, wherein the fourth member is configured to extend alongside a vertically extending portion of a hinge array body of the fiber optic closure to arrest the organizing system in a vertical position.

13. The detachable support bracket of claim 12, wherein the bracket comprises a lower face and an abutting face along an angle between the longitudinal axis and the transverse axis, wherein the tooth extends from between the lower face and the abutting face.

14. The detachable support bracket of claim 12, wherein the third member extends upward along the vertical axis to form a post at which the organizing system is arrestable substantially along the vertical axis.

15. The detachable support bracket of claim 12, wherein the third member comprises a pair of faces angled to one another, and wherein the organizer system is configured to abut the pair of faces to arrest substantially along the vertical axis.

16. The detachable support bracket of claim 15, wherein the pair of faces are positioned 90 degrees to one another.

17. The detachable support bracket of claim 15, wherein the pair of faces is tilted at an angle between zero and approximately 80 degrees from the longitudinal axis.

18. The detachable support bracket of claim 12, wherein a step is formed between the second member and the third member at which an open end of the organizer system is couplable to the bracket in the vertical position.

19. The detachable support bracket of claim 12, wherein the bracket comprises teeth extending alongside the fifth member, and wherein teeth at the bracket are configured to engage within an opening at the hinge array body of the fiber optic closure.

20. The detachable support bracket of claim 12, wherein the bracket is a unitary, monolithic component.

* * * * *